3,383,273
FLEXIBLE SHEET MATERIAL
Roland William Pearson, Burton Green, Kenilworth, England, and Faredoon Shapurji Daruwalla, deceased, late of Sutton Coldfield, England, by Dolly Faredoon Daruwalla, Bombay, India, and Brian Michael Parlour, Sutton Coldfield, England, administrators and legal representatives, assignors to Dunlop Company Limited, London, England, a British company
Filed Oct. 31, 1963, Ser. No. 320,564
5 Claims. (Cl. 161—154)

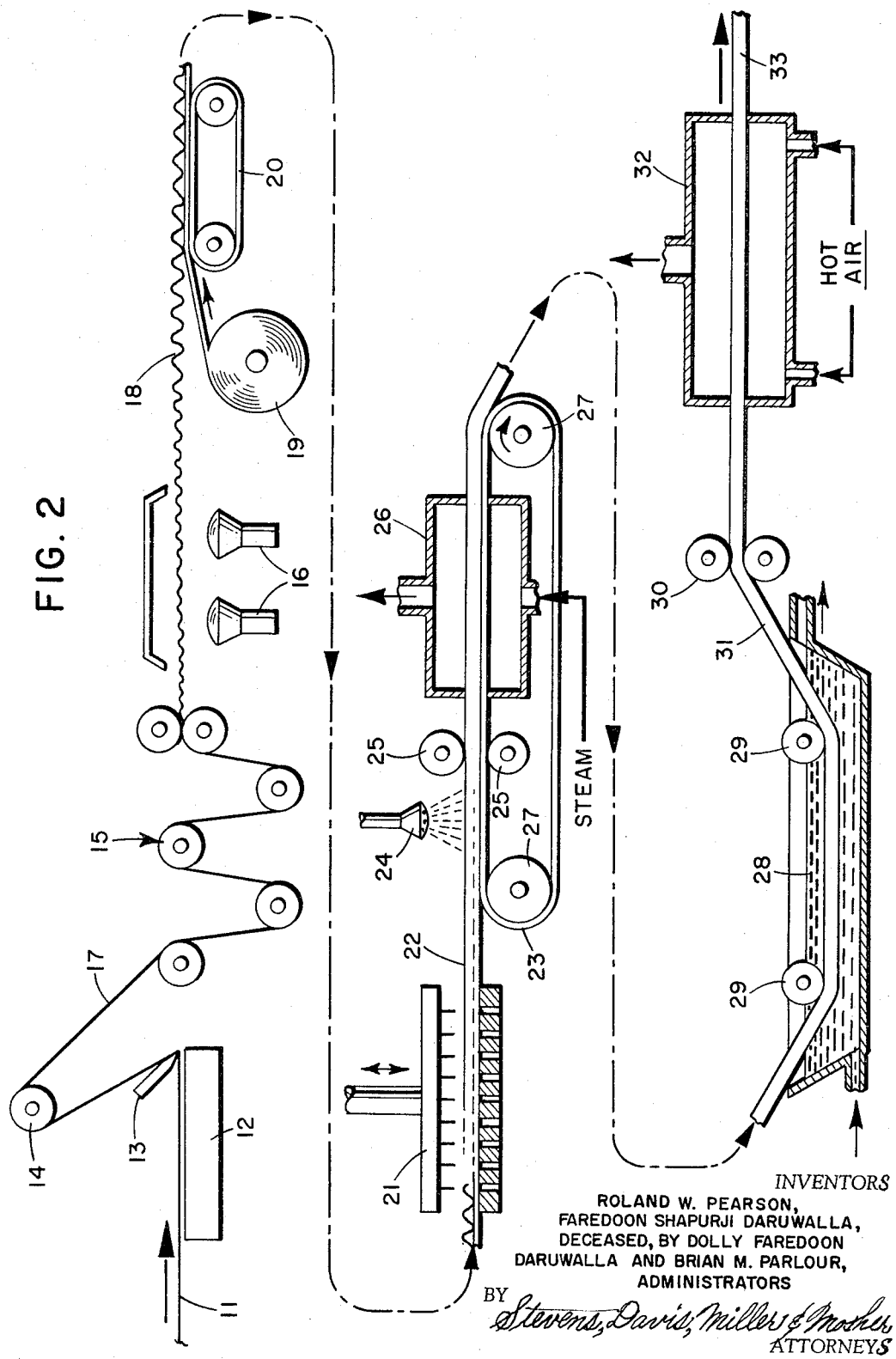

ABSTRACT OF THE DISCLOSURE

A leather-like sheet material and method of making same including a mat of crimped continuous organic fibres to which a layer of non-woven staple organic fibres is needled, the continuous fibres and the staple fibres then being bonded together with a bonding agent.

---

Figure 1:
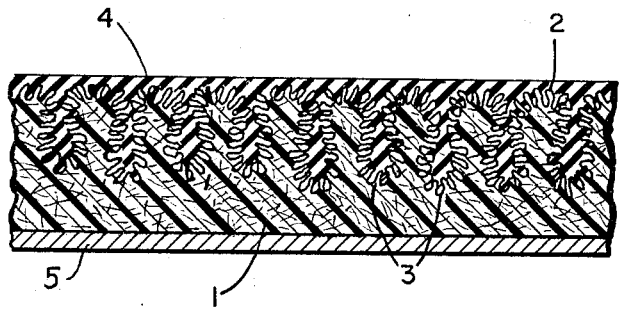

This invention relates to flexible sheet material.

According to the present invention a leather-like sheet material comprises a consolidated composite sheet comprising a mat of interpenetrated crimped continuous fibres having a layer of non-woven staple fibres needled on to or otherwise adhered to at least one surface of it, the interpenetration of the fibres being in the nature of an intermingling at random in three dimensions produced by laying the crimped continuous fibres under tension and subsequently releasing the tension, the continuous fibres and the staple fibres being bonded together with a resinous or elastomeric bonding agent.

Also in accordance with the invention, a method for the production of a leather-like sheet material comprises forming a mat of crimped continuous fibres, needling on or otherwise adhering a layer of non-woven staple fibres to at least one surface of the mat, and consolidating the fibrous assembly in the presence of material affording a bonding agent, the crimped continuous fibres being subjected to tension and allowed to relax before the needling on or other adhering of the non-woven staple fibres.

By means of the technique of the present invention, the suitability of the sheet material for treatment with surface coating compositions can readily be considerably improved in that the non-woven staple fibres needled on or otherwise adhered to one (or each) side of the material can afford a particularly even surface on which a uniform coating can be applied. A coated sheet material having improved appearance and also improved flexing resistance can thus be obtained.

The "needling" referred to above is to be understood to denote attachment by punching with barbed needles in a needle loom. Preferably the layer of non-woven staple fibres needled on to the mat of continuous fibres is a non-woven fabric which is stretchable under normal loads and does not impair the flexing properties of the product. More specifically, it may for example consist of randomly-laid staple fibres bonded with a resinous or elastomeric bonding agent. The staple fibres may suitably be crimped nylon staple fibres, though it is also possible to use any other synthetic, artificial or natural fibres adapted to be needled on to a mat of crimped continuous fibres. The depth of penetration and the intensity of punching which are adopted for the needling operation will naturally be determined having regard to the weight and type of the continuous-fibre mat and the staple-fibre layer being used. In a typical case the depth of penetration of the needles may be 0.050 to 0.500 inch; the intensity of punching may, for example, be 2000 to 5000 punches per square inch. The punches may be given in several passages through the needle punching machine, or in a single passage, if the capacity of the needle punching machine permits the necessary number of punches to be given in one passage.

The layer(s) of non-woven staple fibres to be used for surfacing the web may contain a suitable bonding agent (e.g. a polyurethane), or may again consist of a carded or air-laid web which has been subjected to light needling treatment in a needle-punching machine. The needle-punching treatment should not be so extensive that an uneven surface is produced. In general, a somewhat greater weight of top coating polymer is required per unit area when the non-woven layer does not contain an elastomeric binder, but a smooth surface may nevertheless be achieved after a reasonable quantity of top coating polymer has been applied.

The needles may penetrate the combined fibrous webs (referring to the case in which there is a non-woven staple fibre layer on one surface only) either from the "surfaced" side or from the "continuous fibre" side. In general, greater cohesion between the fibrous layers will be obtained if the continuous filaments are punched into the non-woven staple fibre layer, but it is not essential to the improvement of the surface-coating properties of the web that such interpenetrating should take place. In fact, too great a penetration of the barbed sections of the needles into the non-woven staple fibre layer may have a deleterious effect on the finished surface, since loops of continuous fibre will protrude through the smooth surface.

Generally the mat of crimped continuous fibres, and the binding material, may be of any applicable type. For example, the mat may be obtained by relaxing two or more warp sheets of edge-crimped continuous filament nylon yarns, and the bonding material may be a compounded butadiene-acrylonitrile copolymer rubber latex.

The invention is illustrated by way of example only in the accompanying drawings which are not to scale.

FIG. 1 is a diagrammatical cross-section of a leather-like material according to the present invention, and FIG. 2 is a diagrammatical representation of a method by which the material of the present invention may be made.

As shown in FIG. 1, the material of the present invention comprises a layer of staple fibers 1 and a layer of continuous fibers 2, only a single layer of the latter being shown for simplicity.

The attachment of the continuous fiber layer to the staple fiber layer is represented for simplicity in FIG. 1 by individual loops 3 of crimped continuous filament which have been pushed by the needles into the staple fiber layer.

As shown in FIG. 2, in the preparation of a leather-like sheet material according to the present invention, a sheet of continuous fibers 11 is passed under tension over a hot plate 12 and crimped by passing around a knife edge 13. From the knife edge 13 the extended crimped fibers 17 are passed over a roller 14 and into a haul-off unit 15 where the tension is removed from the crimped fibers. The relaxed fibers are then passed over heaters 16 in order to develop the crimp so that the sheet of fibers expands into a web 18. The web 18 is passed onto a staple fiber non-woven fabric supplied from roll 19 and the assembly is passed across the feed sheet 20 of a needle punch machine 21. In the needle punch machine 21 the assembly is consolidated and the continuous fiber layer needled to the layer of staple fiber non-woven fabric.

The needle punched assembly 22 is then passed onto a stainless steel endless belt 23, which passes around the rollers 27, and is carried on the stainless steel belt beneath a reciprocating spray head 24, which sprays binder composition 4 onto the assembly, between the squeeze rollers 25 which ensure even impregnation of the needle punched assembly, and through a steam chest 26 fed with live steam in which the impregnated assembly is heated to coagulate the binder.

From the stainless steel belt the impregnated assembly is passed around the rollers 29 which are immersed in a wash bath 28 and the wet assembly 31 is then passed through a mangle 30 and into a hot air oven 32 in which the assembly is dried.

Finally, the dried impregnated assembly 33 is pressed to the desired thickness in a suitable mold (not shown), and the finished product can then be given a surface coating 5 as shown in FIG. 1.

The following example illustrates the invention.

*Example*

A web of crimped continuous-filament nylon fibres, and a nylon staple-fibre non-woven fabric, were first prepared.

The continuous-filament web was prepared from warp sheets of untwisted continuous-filament nylon yarns of 840 denier and 140 filaments, having 9 ends per inch. Each warp sheet was heated over a hot plate and then passed over a continuously-cooled knife-edge at an approximate included angle of 28°. Two of the edge-crimped warp sheets so obtained, held under tension, were laid one upon the other, and the assembled warp sheets were relaxed, i.e. released from all tension, so that the filaments were completely free to crimp, at about 100° C. The relaxed web, in which the individual filaments were intermingled, had an approximate weight of 150 grams per square metre.

The staple-fibre non-woven fabric was prepared from a layer of randomly-laid crimped nylon staple fibre of 3 denier by bonding with an equal weight of a rubbery polyurethane binder, and it too had an approximate weight of 150 grams per square metre.

The continuous-filament web was laid on top of the staple-fibre non-woven fabric, and the assembly was passed four times through a needle punching machine adjusted to give 800 punches per square inch, so that the assembly received altogether 3200 punches per square inch. The depth of penetration of the needles was 1/16 inch.

The needled assembly, which had an area of 933 sq. cms., was next impregnated with a compounded butadiene-acrylonitrile copolymer rubber latex made up as follows:

| | Grams |
|---|---|
| Butadiene-acrylonitrile copolymer latex of 40% total solids content | 61 |
| Zinc oxide (50% dispersion in water) | 4 |
| Sodium silicofluoride (50% dispersion in water) | 6.9 |
| Carbon black (4% dispersion in water) | 4 |
| Water | 130 |

The impregnated assembly was heated to 65° C., this being high enough to coagulate the copolymer in the presence of the fibres, and was then washed, mangled to remove some of the water, and dried at 50° C., in an air-circulating oven. The dry web was compressed to a density of 0.75 by pressing at 120° C. for 10 minutes in a mold containing spacers of a thickness appropriate to this density, viz. 0.030 inch. In the finished material, the ratio by weight of the fibre content to the binder content (including the binder in the non-woven fabric) was 40:60.

On its "non-woven fabric" side, the surface of the material obtained was smooth, and this surface was given a continuous coating, with no visible porosity, with only 2 grams (for an area of 933 sq. cms.) of a pigmented thermoplastic-polyurethane solution applied by spraying; furthermore, the surface so coated could be embossed with only slight compression to give an even pattern over the whole sample.

The pigmented thermoplastic-polyurethane solution just mentioned was made up as follows:

| | Grams |
|---|---|
| High-molecular-weight thermoplastic polyurethane rubber | 100 |
| Methyl ethyl ketone | 400 |
| Burnt umber (pigment) | 5.8 |
| Ferrite yellow | 3.6 |
| Red iron oxide | 0.8 |
| Titanium dioxide | 7.1 |

These ingredients were milled in a ball mill for 24 hours and diluted with 3 times the weight of the dispersion of methyl ethyl ketone for spraying.

For the purpose of comparison, it may be mentioned that when a web of crimped continuous-filament nylon fibres was prepared from four edge-crimped warp sheets as described above, needled without any staple-fibre non-woven fabric (though using the deeper needle penetrations of 1/8 inch in the first three passages and 1/4 inch in the last), impregnated with a compounded butadiene-acrylonitrile copolymer latex as before but having actually an increased copolymer content, and heated to effect coagulation, washed, mangled, dried and compressed to a density of 0.75 as before, the surface of the material obtained was such that even a series of applications of the pigmented thermoplastic-polyurethane solution by spraying were not sufficient to cover the irregular highly-porous areas which were visible on the surface to the naked eye. These irregularities in the surface could not, moreover, be removed by the application of moderate compression against an embossing plate.

Having now described our invention, what we claim is:

1. A leather-like sheet material having a surface suitable for application of a coating composition, said material comprising a consolidated composite sheet comprising a mat of crimped continuous organic fibers, and a layer of non-woven crimped staple organic fibers needled on to at least one surface of said crimped continuous fiber mat, the mat of crimped fibers and the layer of non-woven staple organic fibers being bonded together with a bonding agent.

2. A material according to claim 1, wherein the non-woven staple organic fibers are bonded together to form said layer.

3. A material according to claim 1, wherein the crimped continuous fibers are intermingled at random throughout the mat.

4. A material according to claim 1, wherein the staple fibers comprise crimped nylon staple fibers.

5. A method for the production of a leather-like sheet material comprising the steps of forming warp sheets of untwisted potentially crimpable continuous fibers, treating said warp sheets under tension to develop the potential crimp in the fibers, forming a mat of said warp sheets, relaxing the tension on said sheets thereby permitting said fibers to crimp and intermingle, bonding a layer of non-woven crimped nylon staple fibers together, needling said staple fibers to at least one surface of said mat, and bonding said mat of continuous fibers and said layer of staple fibers together.

References Cited

UNITED STATES PATENTS 2,908,064 10/1959 Lauterbach et al. _____ 28—72
3,216,082 11/1965 Goy _____ 28—72.2
3,235,935 2/1966 Daruwalla _____ 161—154 X

FOREIGN PATENTS 879,024 10/1961 Great Britain.

ROBERT F. BURNETT, *Primary Examiner.*

ALEXANDER WYMAN, JACOB H. STEINBERG,
*Examiners.*

G. D. MORRIS, R. L. MAY, *Assistant Examiners.*